Feb. 13, 1968 HISASHI KANEKO 3,369,158

CURRENT-HOLDING DEVICE

Filed Aug. 3, 1964

Inventor
H. KANEKO
By Walter J Baum
Attorney

United States Patent Office 3,369,158
Patented Feb. 13, 1968

3,369,158
CURRENT-HOLDING DEVICE

Hisashi Kaneko, Minato-ku, Tokyo, Japan, assignor to Nippon Electric Company, Limited, Minato-ku, Tokyo, Japan, a corporation of Japan Filed Aug. 3, 1964, Ser. No. 387,134
Claims priority, application Japan, Aug. 20, 1963, 38/44,442
8 Claims. (Cl. 317—154)

This invention relates to a current-holding device for holding, for a certain interval of time, a current value corresponding to a sampled signal value.

In pulse communication systems such as pulse-code modulation (PCM), pulse-phase modulation (PPM), pulse-amplitude modulation (PAM), etc., and in pulse-controlled automatic control systems, a sample-holding device is required to hold a sampled value or to hold until completion of the modulating or controlling operation, a sampled signal value obtained by sampling an input signal either at a constant rate or at a rate which varies in accordance with a predetermined law. In the prior art, a voltage-holding device was used to hold the sampled value. In such prior art device a sampled signal value is held as the voltage across a capacitor for a desired period of the holding time. In these devices the capacitor is charged by closing a switch at the sampling time point and by subsequently opening the switch. Such a voltage-holding device, in many cases is inconvenient because the impedance of the output circuit must be high enough to prevent too rapid discharge of the electric charge stored in the capacitor (although the device may slowly discharge the signal value in accordance with the discharge curve). In order to provide a high impedance, it is necessary (if the voltage-holding device is used in a circuit including a transistor or other semiconductor element), to transform the impedance by means of an emitter follower etc. An emitter follower, however, introduces into the held signal value the effect of the input resistance of the emitter follower. Therefore, use of a current-holding sampling device, instead of a voltage-holding device will be preferable whenever such a holding device is to be used in combination with a transistor circuit.

An object of the invention is therefore to provide a current holding sampling device.

Another object of the invention is to provide a current-holding sampling device which can efficiently hold a given input signal as the current value.

Still another object of the invention is to provide a current-holding device which is adapted to holding the sampled values in a time-division multiplexed system.

The above-mentioned and other features and objects of this invention and the means for attaining them will become more apparent and the invention itself will be best understood by reference to the following description of embodiments of the invention taken in conjunction with the accompanying drawings in which.

Figures 1, 2, 3, 4, 5, 6, 7:
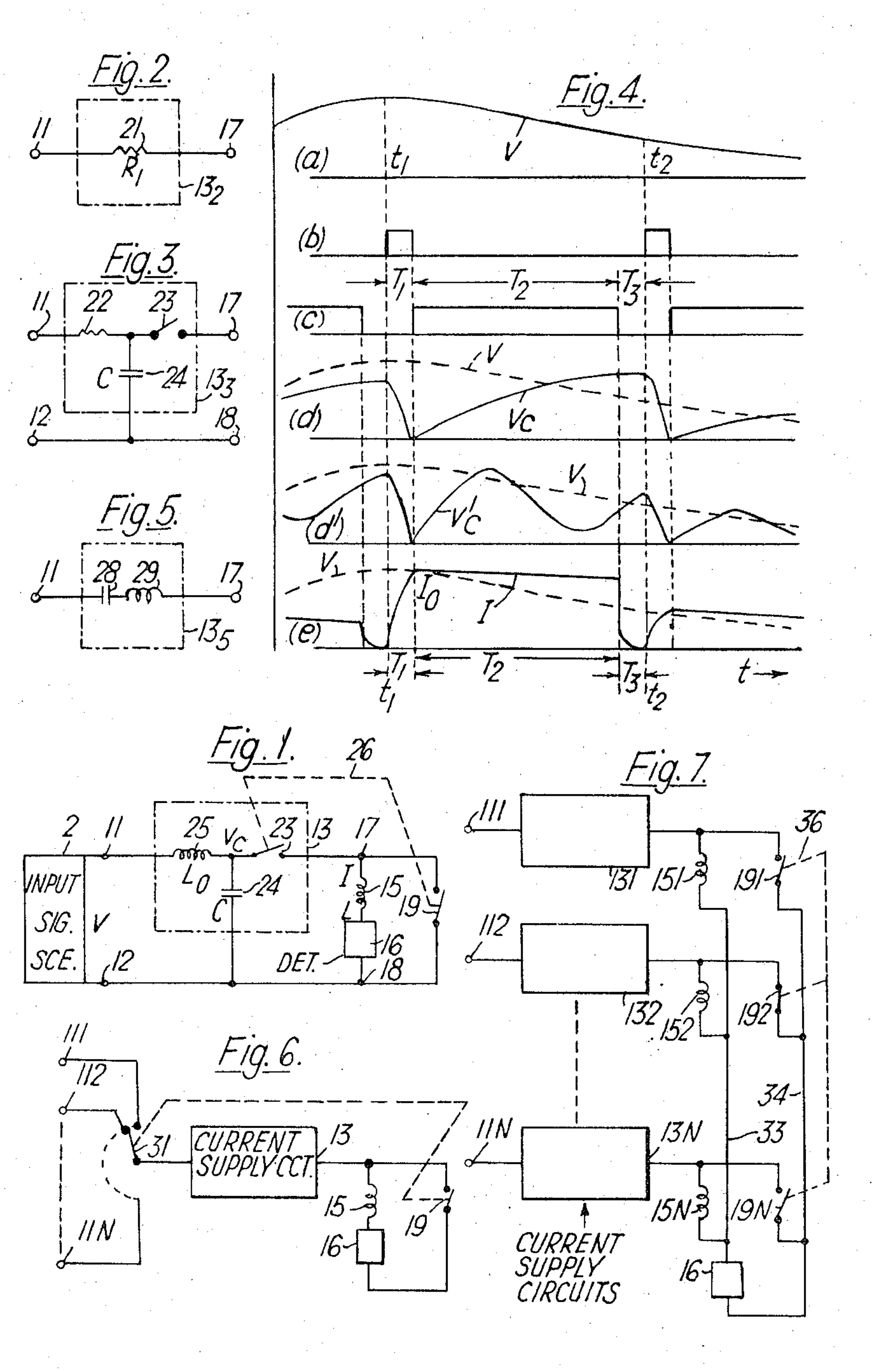
FIG. 1 is a circuit diagram of a preferred embodiment of the invention.
FIG. 2 is a circuit diagram of an example of a current supply circuit for use with the current-holding device of the invention.
FIG. 3 is a circuit diagram of another example of the current-supplying circuit.
FIG. 4 illustrates waveforms obtained at various points in the circuit of FIG. 1 and which will be used to explain the operation of the current-holding device of FIG. 1.
FIG. 5 is a circuit diagram of still another embodiment of a current supply circuit.
FIG. 6 is a block diagram of an example of a time-division multiplexed sample-holding system in which the current-holding device of the invention is embodied.
FIG. 7 is a block diagram of another embodiment of a time-division multiplexed sample-holding device.

Referring to FIG. 1 there is illustrated therein the current-holding device of the invention. This device includes a pair of input terminals 11 and 12 for receiving input signals (to be sampled and held) from an input source 2. A current-supply circuit 13 is connected at one end thereof to the first input terminal 11. A holding coil 15 and a current-detecting circuit or a utilization device 16 are connected in series between the current-supply circuit 13 and the second input terminal 12. A short-circuiting switch 19 is interposed between terminal 17 of the holding coil 15 and terminal 18 of detector 16. The terminal 18 of the current-detecting circuit 16 is connected to the second input terminal 12. The input impedance of the current-detecting circuit 16 is generally small and will therefore be neglected in the following description. The input signal supplied by source 2 to the input terminals 11 and 12 when switch 19 is open will cause current to flow through current-supply circuit 13. In turn a current I will flow through the holding coil 15 and the current-detecting circuit 16. If the short-circuiting switch 19 is then closed to short-circuit the series connected holding coil 15 and the current-detecting circuit 16, the general tendency of the coil will be to oppose change in the current. Thus, the current I will continue to flow in the holding coil 15 and the current-detecting circuit 16 instantaneously after the closing of short-circuiting switch 19. In effect, however, the signal current I will decrease with time $t$, due to the total residual resistance $R_L$ of the holding circuit 15, the current-detecting circuit 16, and the short-circuiting switch 19. The current I will decay according to the exponential function $$I=I_0\cdot\exp([R_L/L]-t) \quad (1)$$

where L is the inductance of the holding coil 15 (and $L/R_L$ is consequently the time constant of the parallel circuit consisting of the holding coil 15, in series with detector 16 and the short-circuiting switch 19), and $I_0$ is the magnitude which the signal current assumes instantaneously upon closing of the short-circuiting switch 19. If the residual resistance $R_L$ is sufficiently small, then the time constant $L/R_L$ is large enough to provide a long holding time.

Referring to FIG. 2, a simple current-supply circuit 132 will be described which can be used to replace the current supply circuit 13 shown in FIG. 1. The current-supply circuit $\mathbf{13}_2$ of FIG. 2 merely comprises a resistor 21 having a resistance $R_1$ interposed between the first input terminal 11 and the terminal 17 of the holding coil 15 both as shown in FIG. 1. Inasmuch as a current-supply circuit must have a constant-current characteristic, it will be assumed that the resistance $R_1$ is large. It is furthermore to be noted that if the short-circuiting switch 19 has been switched from the open state to the closed state, then the time constant of the circuit comprising the current-supply circuit $\mathbf{13}_2$, the holding coil 15, and the short-circuiting switch 19 will be $L/R_1$ and consequently larger values for the resistance $R_1$ will provide in steeper build-up of the signal current I at the next sampling time point or at the moment when the next input signal is applied.

Referring to FIG. 3, another embodiment of a current supply circuit $\mathbf{13}_3$ is illustrated therein which can replace circuit 13 of FIG. 1. The current supply of FIG. 3 comprises a resistor 22 of high resistance, connected at one end thereof to the input terminal 11 shown in FIG. 1. The sampling switch 23 is interposed between the other end of resistor 22 and the first terminal 17 of the holding coil 15. A resonance capacitor 24 having a capacity C is connected between the junction point of the resistor 22 and the sampling switch 23 and the second input terminal 12 shown in FIG. 1 or the second terminal 18 of the current-detecting circuit 16. This current-supply circuit $13_3$ of FIG. 3 has a better current-supply efficiency than the current-supply circuit $13_2$ of FIG. 2. In operation, it will at first be assumed that the short-circuiting switch 19 shown in FIG. 1 is open and the sampling switch 23 shown in FIG. 3 is also open. Inasmuch as the first terminal 17 of the holding coil 15 is disconnected from the input source, no current I will flow through the holding coil 15 and the current-detecting circuit 16. Consequently, the input signal supplied across the input terminals 11 and 12 will charge the resonance capacitor 24 through the resistor 22. Now assume that the sampling switch 23 is kept closed for the duration of a sampling time interval $T_1$. Inasmuch as a resonance circuit is formed during the sampling time interval $T_1$ by the resonance capacitor 24 and the holding coil 15, the energy stored in the resonance capacitor 24 will be transferred between the capacitor 24 and the holding coil 15 at a resonance frequency $f$. The resonance frequency $f$ is given approximately by $$f=1/(2\pi\sqrt{LC}) \qquad (2)$$

if the resistance of the resonance capacitor 24 is neglected. Therefore, when the sampling time $T_1$ and a fourth of the resonance period are selected to be equal to each other, then the following equation will hold:

$$T_1=1/(4f)=\pi\sqrt{LC/2} \qquad (3)$$

In this situation the entire charge stored in the resonance capacitor 24 is transferred to the holding coil 15 at the end of the sampling time interval $T_1$ and the signal current 1 will reach a maximum at that time. Consequently, by closing the short-circuiting switch 19 at the last moment of the sampling time interval $T_1$ or at the same time as the sampling switch 23 is opened, it is possible to hold the signal current I of the maximum value in the series circuit of the holding coil 15 and the current-detecting circuit 16. It is also possible, as a result of the shape of the sine curve, to hold the signal current I at the maximum value when $$T_1=(1+4n)/(4f) \qquad (4)$$

where $n$ is zero or a positive integer. Better efficiency, however, will generally be achieved for resonance circuits having unfavorable quality factors if the integer $n$ is zero. Furthermore, it is possible, when $$T_1=(3+4n)/(4f) \qquad (5)$$

to hold the signal current I at a value other than the maximum value. The signal current I held in Equation 5 is the value assumed after three-quarter of the period of resonance and consequently is in a sense opposite to that of the signal current I at the sampling time point.

Returning to FIG. 1, the current-supply circuit 13 shown therein makes use of a coil 25 to improve the resonance-characteristic. The coil 25 is used in place of the resistor 22 used in the current-supply circuit $13_3$ of FIG. 3. It will be recalled that in the current supply circuit $13_3$ of FIG. 3, an increase in the current-supply efficiency was brought about by a resonance circuit comprising the resonance capacitor 24 and the holding coil 15 shown in FIG. 1. The increase, however, will be slight unless the resistance of the resistor 22 is so high that the quality factor of the resonance circuit is kept high. On the other hand, too high a resistance for the resistor 22 will increase the loss in the resistor 22. In contrast, the current-supply circuit 13 of FIG. 1 can raise the current-supply efficiency without any accompanying loss.

Referring to FIG. 4, there is illustrated therein a number of waveforms which will explain the operation of this invention. These waveforms are plotted with time on the abscissa axis and voltage amplitude on the ordinate axis. In FIG. 4 it will be assumed that an input signal having the voltage $v$ as shown in FIG. 4($a$) is applied across the input terminals 11 and 12; that the sampling switch 23 is closed as shown in FIG. 4($b$), for the sampling time interval $T_1$ from each of sampling time points $t_1$, $t_2$, . . .; that the short-circuiting switch 19 is closed, as shown in FIG. 4($c$), for the holding time interval $T_2$ from the moment at which the sampling switch 23 is opened until a little before the beginning of the next sampling time interval; and that an idle time interval $T_3$ is left between the closure of the short-circuiting switch 19 and the beginning of the next sampling time interval. During the idle time interval $T_3$ where both the short-circuiting and the sampling switches 19 and 23 are open, the signal current I is kept at zero in the series circuit of the holding coil 15 and the signal-detecting circuit 16. When the sampling switch 23 is closed at a sampling time point, the charge stored in the capacitor 24 will cause a current I to flow in the manner described with reference to FIG. 3. If the sampling time interval $T_1$ is selected according to Equations 3, 4 or 5, the energy stored in the resonance capacitor 24 is substantially transformed into electromagnetic energy in the holding coil 15 during the time interval $T_1$. It follows therefore that the terminal voltage $v_C$ of the resonance capacitor 24 decreases (as shown in FIG. 4($d$)) down to zero at the end of a sampling time interval $T_1$. Moreover, as shown in FIG. 4($e$), the signal current I increases during the sampling time interval $T_1$ from zero to a maximum value $I_0$ corresponding to the energy which was stored in the resonance capacitor 24. When the sampling switch 23 is opened and the short-circuiting switch 19 is simultaneously closed, the maximum signal current $I_0$ which flows at the end of the sampling time interval $T_1$ (from the resonance capacitor 24 to the holding coil 15) now flows through the loop consisting of the holding coil 15, the current-detecting circuit 16, and the short-circuiting switch 19 and is held (decreasing in the manner illustrated in FIG. 4($e$)) in accordance with Equation 1. If the holding time interval $T_1$ is sufficiently smaller than the time constant $L/R_L$ of the loop, the current-holding device will have a sufficient current holding capacity as illustrated in FIG. 4($e$).

Continuing to refer to FIGS. 1 and 4, the coil 25 is intended to improve the resonance-characteristic. This is achieved by utilizing (as indicated in the above-explained example wherein use was made of the resonance characteristic of the holding coil 15 and the resonance capacitor 24 during the sampling time interval $T_1$) the resonance characteristic of the coil 25 and the resonance capacitor 24 for the holding and the idle time intervals $T_2$ and $T_3$. In these time intervals the sampling switch 23 is open and the coil 25 and the capacitor 24 will store the input signal in the resonance capacitor 24 with excellent efficiency. More particularly, if the inductance of the coil 25 is $L_0$ and if the resonance frequency $f_0$ of the resonance circuit comprising the coil 25 and the resonance capacitor 24 is given by:

$$f_0=1/(2\pi\sqrt{L_0C}) \qquad (6)$$

then the terminal voltage $v_C$ of the resonance capacitor 24 reaches a maximum at the end of the time interval $T_2+T_3$ or at the beginning of the sampling time interval $T_1$, if $$T_2+T_3=(1+2m)/(2f_0) \qquad (7)$$

or $$T_2+T_3=\sqrt{L_0C}(1+2m) \qquad (8)$$

where $m$ is generally zero or a positive integer. The waveforms for the conditions $m=0$ and $m=1$, are shown in FIGS. 4($d$) and 4($d'$) respectively.

In general, the inductance L of the holding coil 15 must be larger than a certain value so that the held current may not appreciably decrease during the holding time interval $T_2$. For this case of a large inductance L a larger current will be held when the capacity C of the resonance capacitor 24 is somewhat larger than that which is needed to satisfy Equations 3 or 4. Too large a capacity C, however, reduces the impedance of the resonance circuit and consequently will reduce the maximum value of the held current. The capacity C for the maximum held current may be empirically determined with ease, although it can be derived through complicated calculation. It is to be noted, however, that the capacity C which will satisfy the resonance condition 3 or 4 is advantageous for stable operation of the elements since it is preferable to close the short-circuiting switch 19 when the terminal voltage $v_C$ of the resonance capacitor 24 is zero.

From the above description it will be appreciated that in the preferred embodiment of the invention shown in FIG. 1, ingenious utilization of the relation between the resonance of the resonance capacitor 24 and the holding coil 15 or of capacitor 24 and the coil 25, on the one hand, and the timing in operation of the short-circuiting switch 19 or the sampling switch 23, on the other hand, makes it possible to efficiently hold a desired signal value in holding coil 15 in the form of the current value. Incidentally, the current-holding device of FIG. 1 as shown therein by a dotted line, also includes means 26 for switching the short-circuiting and the sampling switches 19 and 24 in the above-mentioned manner.

Referring to FIG. 5, there is illustrated therein still another current-supply circuit $\mathbf{13_5}$. The current supply of FIG. 5 includes a capacitor 28 connected to the first input terminal 11 shown in FIG. 1 and a coil 29 connected in series between the capacitor 28 and the first terminal 17 of the holding coil 15. In this case it is also possible, (as with the current-supply circuit 13 shown in FIG. 1) to preselect the resonance period of the capacitor and coil 28 and 29 and control the timing of switching of the switch 19 so that a maximum signal current can be held in the series circuit consisting of the holding coil 15 and the current-detecting circuit 16.

The construction of a time-division multiplexed sample-holding device using the principle of the current holding device of this invention is quite simple. All that need be done is to provide and install a current-supply circuit 13 shown in FIG. 1 to receive the respective input signals supplied by respective channels to be multiplexed in the time-division fashion. Additionally, the output sides of the current-supply circuits are then connected to a common holding coil 15 with a short-circuiting switch 19. Moreover, means are provided for switching the sampling switch 23 and the corresponding sampling switches of the current-supply circuits and the short circuiting switch 19 in such a manner that the input signals of the respective channels are successively supplied to and held in the series circuit comprising the holding coil 15 and the current-detecting circuit 16. Current values can thus be held to give time-division multiplexed samples.

Referring to FIG. 6, there is illustrated therein a time-division multiplexed sample-holding system using the current-holding device of the invention. This system has input terminals 111, 112, . . ., and 11N for receiving input signals from a plurality of channels to be time division multiplexed. A rotary switch 31 is provided to scan the input terminals 111, 112, . . ., and 11N to provide successive input signals which represent each of the channels in cyclic order. A holding coil 15 and a current-detecting circuit 16 are connected in series and a short-circuiting switch 19 is connected in parallel with coil 15 and detector 16 as explained with reference to FIG. 1. A current-supply circuit 13 is provided to supply the input signals selected by the rotary switch 31 to coil 15. Switch means 32 are provided for switching the rotary switch 31 and the short-circuiting switch 19 to retain the above-described relation. It should be noted that this time-division multiplexed sample-holding system can also hold current values in a time-division multiplexed manner.

Referring finally to FIG. 7, there is illustrated therein another time-division multiplexed sample-holding system utilizing the current holding device to the invention. In this system, the input terminals 111, 112, . . ., and 11N receive input signals from a plurality of channels to be time division multiplexed. Current-supply circuits 131, 132, . . ., and 13N (which may be any of the above-mentioned types) are connected respectively at their input ends to the input terminals 111, 112, . . ., and 11N. Each holding coil 151, 152, . . ., and 15N is respectively connected to the output side of the associated current-supply circuits 131, 132, . . ., and 13N. Each short-circuiting switches 191, 192, . . ., and 19N is also respectively connected at one end thereof to the output side of the current-supply circuits 131, 132, . . ., and 13N, respectively. The lead 33 interconnects the other ends of the holding circuits 151, 152, . . ., and 15N. Another lead 34 interconnects the other ends of the short circuiting switches 191, 192, . . ., and 19N. A current-detecting circuit 16 is interposed between the leads 33 and 34. A switch means 36 selectively closes the short-circuiting switch for a particular channel during the time interval in which it is desired to select the input signal of the particular channel. If the current-supply circuits includes the sampling switches which correspond to the sampling switch 23 shown in FIG. 1, then it will be more efficient to hold time-division multiplexed samples if additional switch means are provided for switching the sampling and the short-circuiting switches of each channel in the manner explained with reference to FIG. 1.

Now that the basic inventive concept of this invention has been disclosed, it will be obvious to one skilled in that art that a number of modifications can be made without deviating from the spirit of the invention. For example, it is not necessary to position the sampling switch 23 shown in FIG. 1 at the location illustrated therein. Furthermore, the short-circuiting switch and other switches shown in the drawings as mechanical switches may be electronic switches which may include one or more semiconductor elements which will enable the invention to be used for high-speed operations.

While I have described above the principles of my invention in connection with specific embodiments, it is to be clearly understood that this description is made only by way of example, and not as a limitation to the scope of my invention as set forth in the objects thereof and in the accompanying claims.

What is claimed is:

1. In a current holding circuit, the combination which comprises: an information signal input source; means connected to receive the signals from said source for transforming said signals into currents representative of said signals, a holding coil connected to receive said currents; and first switch means connected in parallel with said coil for selectively short-circuiting said coil whereby the holding coil holds the current flowing therethrough for a predetermined interval after said first switch means is closed; and means for sensing the thus held current.

2. In the combination as set forth in claim 1 wherein the transforming means includes a capacitor connected in parallel with said holding coil and second switch means interposed between said capacitor and said holding coil, the resonance characteristic of the parallel circuit of said holding coil and said capacitor being selected to be a function of the switching frequencies of said first and second switch means.

3. In the combination as set forth in claim 2 wherein the resonance characteristic of said parallel circuit is selected such that the time interval of conduction of said second switch means during the resonance period of said parallel circuit is substantially equal to $(2n+1)/4$ when $n$ is a positive integer and wherein common switch control means are provided and connected to selectively operate said first and second switch means.

4. In the combination as set forth in claim 2 wherein said transforming means further includes a second coil disposed between the input source and said capacitor, the resonance characteristic of the circuit comprising said capacitor and said second coil being selected to be a function of the switch frequencies of said first and second switch means.

5. In the combination as set forth in claim 4, wherein the time constant of said second coil is selected to provide a peak voltage value on said capacitor at a preselected time and wherein control means are provided to close said second switch when said peak value is attained.

6. In the combination as set forth in claim 1 wherein said transforming means includes a series resonance circuit comprising a capacitor and a second coil, which is connected between the input source and said holding coil.

7. In a time division multiplex current sample holding circuit, the combination comprising: at least two information input sources; transforming means connected to said input sources for transforming said information signals into current representative of said information; switch means connected between said sources and said transforming means for cyclically applying the signals from each source to said transforming means; a holding coil connected to receive the output currents from said transforming means; switch means connected in parallel with said holding coil for selectively short circuiting said coil; and means for sensing the current held in said coil each time said coil is short circuited.

8. In a time division multiplex sample holding circuit, the combination comprising: a plurality of signal information input sources; separate transforming means connected to each source for separately transforming the input signals into currents representative thereof; a separate holding coil connected to the output of each transforming means; a separate switch connected in parallel with each of said holding coils for selectively short circuiting the parallel connected coil; means connected to control the operation of all said switches; and means for sensing the current held in said coils whenever the switches are closed.

References Cited

UNITED STATES PATENTS

| | | | |
|---|---|---|---|
| 2,108,014 | 2/1938 | Jones | 340—203 |
| 2,110,015 | 3/1938 | Fitzgerald | 340—203 X |
| 2,187,603 | 1/1940 | Hall | 340—203 X |

MILTON O. HIRSHFIELD, *Primary Examiner.*

J. A. SILVERMAN, *Assistant Examiner.*